Feb. 26, 1963  R. F. SARGENT  3,078,658
CONTROL OF SUPERSONIC FLUID FLOW IN DUCTS
Filed Jan. 3, 1958  2 Sheets-Sheet 1
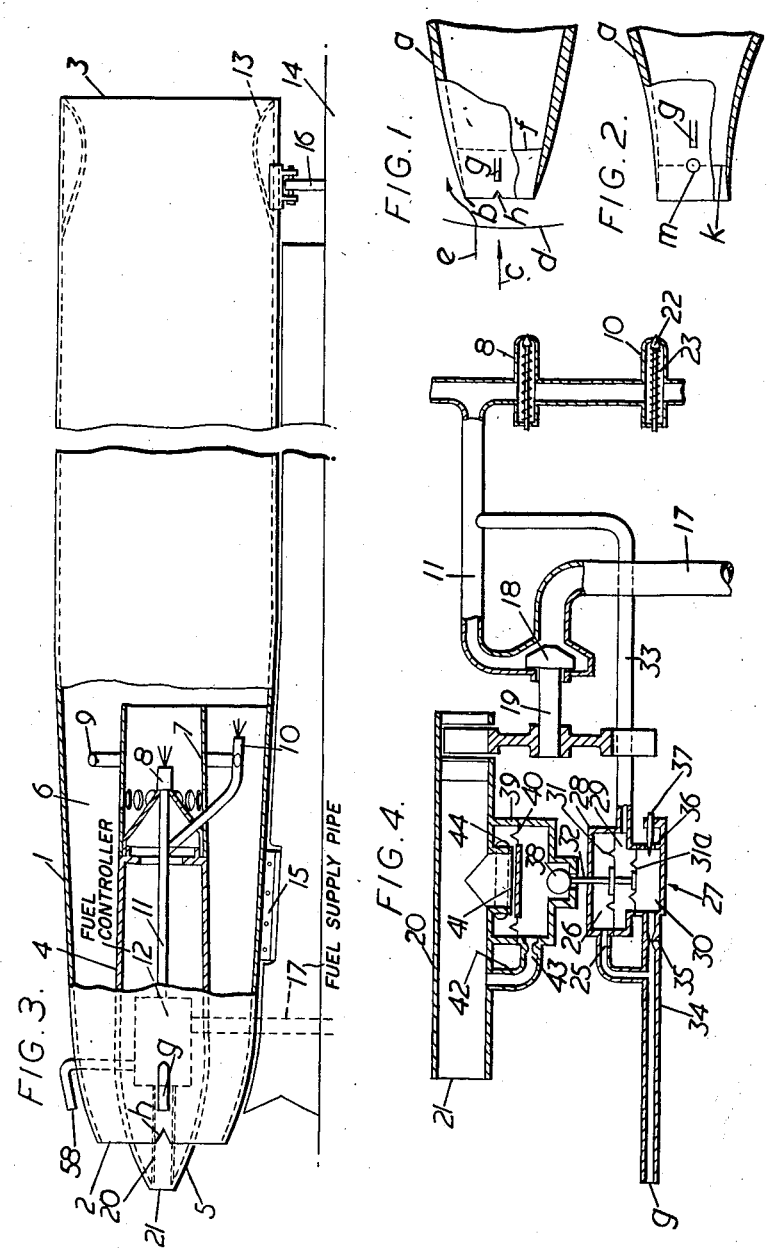
Inventor
RAYMOND FREDERICK SARGENT
By
Bailey, Stephens + Huettig
Attorneys 3,078,658
CONTROL OF SUPERSONIC FLUID
FLOW IN DUCTS
Raymond Frederick Sargent, Bristol, England, assignor, by mesne assignments, to Bristol Siddeley Engines Limited, Bristol, England, a British company
Filed Jan. 3, 1958, Ser. No. 706,975
Claims priority, application Great Britain Jan. 10, 1957
2 Claims. (Cl. 60—35.6)

This invention relates to a device for controlling the flow of gas through a duct of the kind having an open intake end immersed in a gas flowing lengthwise over the outside of the intake end of the duct at supersonic relative velocity so that a shock wave will be maintained at a predetermined position in the duct at or downstream of its intake end.

The duct may for example constitute or form part of a propulsion plant for an aerial vehicle operating by the heating of air flowing through the duct, and in such cases it is usually desirable that a shock wave normal to the direction of flow should occur at the lip of the intake end of the duct.

In the drawings:

FIGURES 1 and 2 each show, partly in cross-section, the forward part of a duct of the type to which the invention is applicable;

FIGURE 3 shows in partial axial section a ramjet engine to which the invention is applied;

FIGURE 4 is a diagrammatic representation of the fuel control system of the engine shown in FIGURE 3;

Figure 5:
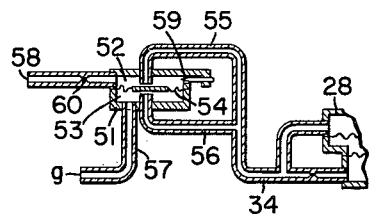
FIGURE 5 shows a device which can be used in conjunction with the mechanism of FIGURE 4.

In FIGURE 1 of the accompanying drawings only the forward part of a duct $a$ is shown, this part comprising an intake opening defined by a lip $b$ and being divergent in the downstream direction indicated by the arrow $c$. At a certain supersonic relative velocity of the surrounding medium to the duct, depending upon the pressure maintained in the duct, a normal shock wave (in passing through which the velocity of the medium changes from supersonic to subsonic) will be formed in the plane of the lip $b$. At this condition, which is known as the critical condition, the pressure recovery is a maximum and the intake drag is a minimum, all internal flow being subsonic. If now the internal pressure is increased, the shock wave will be forced out of the duct to some such position as indicateed by the line $d$, and the condition is said to be sub-critical. In this condition particles of medium passing through the shock wave $d$ in line with an outer peripheral part of the intake opening do not pass into the opening but are deflected over the lip to pass along the outside of the duct at an initially subsonic speed as indicated by the arrow $e$. In other words, some of the medium approaching the intake opening spills over the lip of the duct. If alternatively the pressure in the duct is decreased, the shock wave will move into the duct to a position such as that indicated by the line $f$, and the condition is referred to as super-critical. In this condition supersonic velocity persists over the outside of the duct and internally in the first part of the duct up to the shock wave $f$ and pressure recovery is reduced partly by losses occurring in this part of the duct and partly due to reduction in effective length of the following diffuser section of the duct. Change of condition from critical to subcritical or to supercritical can also result from a change in the relative velocity of the gas in which the intake of the duct is immersed unless the pressure within the duct is varied in a compensatory manner. Consequently, propulsion plants embodying such air intake ducts can only operate efficiently over a small range of supersonic Mach numbers unless a compensatory device is provided which will have the effect of keeping the shock wave located at the lip of the air intake duct. This invention is concerned with such a compensatory device.

The device may also be used to maintain the shock wave at some other predetermined position in a duct. FIGURE 2 shows a duct $a$ with an intake passage of convergent-divergent form, and in this case it may be desired to stabilize the shock wave at a position within the duct, for example at its smallest cross section as indicated by the line $k$.

According to the invention, for the purpose of controlling the flow of gas through a duct of the kind described so as to maintain a shock wave at a predetermined position in the duct, there is provided an opening in the wall of the duct substantially at the required location of the shock wave, means arranged to detect the pressure of the gas flowing over the outside of the duct at a position adjacent the opening where the flow of the gas will be so disturbed by gas flowing out through the opening when the shock wave is located upstream of the most downstream part of the opening as to cause its pressure to change, and means responsive to changes in the pressure so detected for changing the pressure in the duct downstream of the opening in the sense to make the shock wave travel in that direction along the duct which tends to reduce the changes in pressure so detected.

In the particular case in which the shock wave is to be located at the lip of the intake end of the duct the opening may take the form of a notch in the lip of the intake end of the duct.

According to further features of the invention the pressure sensing means is located a short distance downstream of the opening in the duct, either immediately behind the opening with respect to the direction of flow over the duct, or somewhat to one side of that position, and is a head having an impact pressure sensing orifice directed substantially in the upstream direction.

For example, in FIGURE 1 there is a pressure-sensing pitot head $g$ arranged outside the duct $a$ a short distance downstream of a V-shaped notch $h$ formed in the lip $b$. Assuming that the relative speed has been increased to establish the critical condition, the flow over the outside of the duct, except in a region downstream of the notch $h$, will be supersonic, and there will be a steep rise of pressure in going through the shock wave located in the plane of the lip $b$ into the duct. Consequently medium will spill out through the notch $h$ and its effect will be to reduce the relative velocity of the medium in the region downstream of the notch $h$ in which the head $g$ is located, so that the pressure sensed by the head is less than it would be if the head were arranged clear of the effect of the spill through the notch. If now a reduction of pressure occurs inside the duct the shock wave will move into the duct, but as it moves the area of the notch through which spill is occurring is reduced and the spill will have a decreasing effect upon the pressure sensed by the head $g$ so that this pressure will rise, and the rise in pressure can be used to initiate the operation of means to increase the pressure in the duct and thereby obtain a stable condition with the shock wave crossing the notch.

In FIGURE 2 an opening $m$ is provided in the wall of the duct on the line $k$ and a head $g$ is arranged on the outside of the duct downstream of the opening $m$. This arrangement operates in a similar manner to that described with reference to FIGURE 1 and it should be noted that the spill through the opening $m$ which shelters the head $g$ persists if the shock wave moves forward clear of the opening $m$.

Accuracy of control of the location of the shock wave is dependent upon the magnitude of the pressure change sensed by the head for a given displacement of the shock wave, and this in turn is dependent upon the size and shape of the notch and the positioning of the head in relation to the notch. The interrelation of these factors can readily be explored experimentally with a view to obtaining the optimum result in a given installation. The notch is preferably triangular or semicircular with a depth of ¼ to ½ inch. In one particular case the best results were obtained with a symmetrical V-shaped notch, the head being arranged about twice the depth of the notch immediately downstream of the notch with respect to the axial direction of the duct. The orifice of the head should also be spaced from the wall of the duct so as to be outside the boundary layer and in the zone of maximum pressure change. A spacing of between one and two diameters of the orifice from the outside of the casing to the edge of the orifice has been found satisfactory.

The invention is particularly applicable to ramjet engines in which in known manner the supply of fuel into the combustion zone of the duct constituting the engine is controlled by an impact pressure signal picked up by a head arranged in the free airstream. It is known that such a pressure signal varies approximately in direct proportion to the mass flow of air through the duct, so that by metering the fuel in proportion to the signal an approximately constant fuel/air ratio is maintained in the combustion zone. Such an arrangement does not of itself ensure that the engine operates at all times at maximum thrust or maximum efficiency since the position of the normal shock wave with respect to the lip of the air intake varies with changes in a number of factors such as speed, ambient temperature and combustion efficiency, and affects the mass flow through the engine and the pressure recovery in the entry portion of the duct.

If, however, in accordance with a feature of the invention the head of such a fuel control system is arranged outside the duct downstream of a notch in the lip of the air intake opening, the pressure sensed by the head will increase if the shock wave moves downstream from the intake lip towards the base of the notch. As a result of the rise in pressure sensed by the head the supply of fuel to the combustion zone will be increased, thus increasing the pressure in the duct and causing the shock wave to move back towards the intake lip. Conversely, the pressure sensed by the head will decrease if the shock wave moves upstream from the base of the notch towards the intake lip. In this way it is possible to establish a condition of equilibrium in which the shock wave is at all times located quite close to the lip of the air intake. One way of doing this is illustrated by FIGURES 3 and 4.

The ramjet engine shown in FIGURE 3 comprises an outer casing 1 having a forward intake lip 2 and a rear discharge opening 3. An island body 4 having a generally conical front end 5 is mounted in the intake opening so as to project forwardly of the casing 1 and in operation produces, with the casing 1, multiple shock compression followed by diffusion in the annular passage 6 extending rearwardly from the intake opening. The rear end of the island body 4 is shaped to constitute a cylindrical pilot combustion chamber 7 which is open at its downstream end and is provided with a central fuel sprayer 8. In the annular passage 6 around the pilot combustion chamber is arranged a fuel manifold 9 carrying a number of sprayers 10. The manifold and the central sprayer 8 are supplied with fuel through a pipe 11 from a fuel metering system 12 housed in the forward part of the island body 4. At its rear end the casing 1 is provided with a convergent-divergent discharge nozzle 13, and it is attached to a vehicle 14 by means of a forward attachment 15 and a rear attachment 16. The vehicle contains a fuel tank (not shown) from which fuel is supplied through a pipe 17 to the fuel metering system 12.

The fuel metering system 12 is of the kind described in British Patent No. 762,179, more particularly with reference to Figure 2 of the drawings accompanying that patent, but is for convenience repeated diagrammatically in FIGURE 4. The system includes a centrifugal fuel pump 18 driven by an air turbine 19 receiving air through a duct 20 having a forwardly facing intake opening 21 in the center of the conical nose 5 of the island body. Fuel discharged by the pump 18 is carried by the pipe 11 to the fuel sprayers 8 and 10 which are of the kind comprising a member 22 which is displaceable against a spring 23 by the pressure of the fuel so as to control the outlet area to allow a rate of discharge approximately directly proportional to the pressure of the fuel discharged by the pump 18. The pump discharge pressure is itself maintained in substantially direct proportion to a control pressure which is the impact pressure picked up by a forwardly facing head $g$ arranged outside the casing 1 and downstream of a notch $h$ in the lip 2. The control pressure is transmitted through a pipe 25 to act in the chamber 26 of a device 27 which is responsive to the ratio of two pressures and comprises a casing 28 divided into the chamber 26 and two other chambers 29 and 30 by two diaphragms 31 and 31a of different areas interconnected by a rod 32. The chamber 29 formed between the two diaphragms is connected by a pipe 33 to the fuel discharge pipe 11, so that fuel discharge pressure acts upon the diaphragms in opposite directions. The chamber 30 formed on the other side of the smaller diaphragm 31a is connected to the head $g$ by a pipe 34 containing a restriction 35, and the chamber also has a restricted outlet orifice 36 the area of which is adjustable by a needle 37. The effect of this arrangement is to maintain in the chamber 30 a pressure which remains in fixed ratio to the control pressure acting in the chamber 26, and it follows that in order to maintain the diaphragm system in equilibrium the fuel discharge pressure acting in the middle chamber 29 must also vary in fixed ratio to the control pressure. If the fuel pressure rises above the equilibrium pressure the rod 32 joining the diaphragms will be moved upwardly, and such upward movement is arranged to reduce the power output of the air turbine 19 so that the fuel pressure falls to the equilibrium value.

For this purpose the rod 32 is arranged to operate a valve 38 which controls the release of air from a pneumatic servo motor 39 having a diaphragm 40 capable of obstructing a spill outlet 41 in the duct 20. Air for operating the servo motor is taken from the duct 20 through a pipe 42 containing a restriction 43. If the valve 38 is fully closed sufficient pressure will build up below the diaphragm 40 to close the spill outlet 41 so that the air turbine operates at maximum power. Opening of the valve 38 will however reduce this pressure, by an amount depending upon the opening, so that the diaphragm 40 can be displaced by the pressure in the duct 20 and will allow air to spill out of the duct and flow away through the outlet 44.

In this arrangement the flow of fuel to the sprayers is substantially directly proportional to the control pressure picked up by the head $g$ and it therefore follows that operation with critical intake condition can be maintained, since a tendency to change to supercritical operation, involving an increase in the pressure sensed by the head $g$, results in an increase in fuel flow and therefore an increase in the internal pressure which will return the shock wave to the critical position.

To avoid the possibility of an over-control action taking place which, by unduly reducing the flow of fuel to the engine, would cause its complete shut-down, a low-limit stop device may be provided. In FIGURE 5 such a device is shown. It comprises a casing 51 divided into two chambers 52 and 53 by a flexible diaphragm 54 which also acts as a valve member to close the end of one or other of two pipes 55 and 56 both of which are connected to the pressure-ratio device 28 by way of the pipe 34 in place of the head g. The control pressure picked up by the head g is admitted into the chamber 53 through a pipe 57, while a second impact pressure sensing head 58 arranged in the free airstream clear of any shielding by air spilling through the notch h delivers air into the chamber 52. The pressure thereby produced in the chamber 52 is reduced, by providing a restricted outlet 59 and a restriction 60 in the pipe leading from the head 58, to a value below that picked up by the head g during normal operation and suitable to constitute the low limit of the control pressure. The diaphragm 54 then acts as a high pressure selector to select whichever is the higher of the pressure picked up by the pitot head g or the low limit control pressure in the chamber 52 for admission into the pressure-ratio device 28 as the control pressure for determining the discharge pressure of the fuel pump 18.

The needle 37 enables an initial tuning adjustment of the fuel/air ratio to be made, and by providing a Mach meter to effect such adjustments automatically it is possible to make the engine self-controlling in free flight to fly at a predetermined Mach number. Such an arrangement can be used in conjunction with the present invention, the shock wave locating arrangements of the present invention remaining operative during the acceleration period of the engine until the desired free flight Mach number is reached and then being over-ridden by the Mach meter control, which acts to reduce thrust to that necessary to maintain the desired Mach number by weakening the fuel/air ratio. This method of operation leads to the establishment of supercritical conditions in the intake zone of the engine during operation at the reduced thrust.

Figure 6:
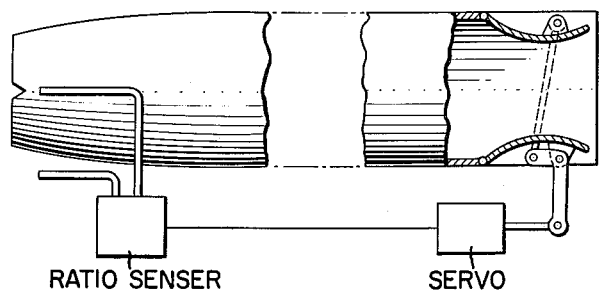
FIGURES 6 and 7 show the mechanisms for the control of the exhaust nozzle area and intake area respectively.
Figure 7:
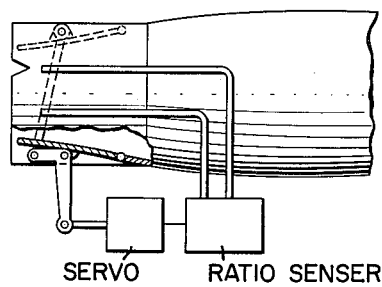
Figure 8:
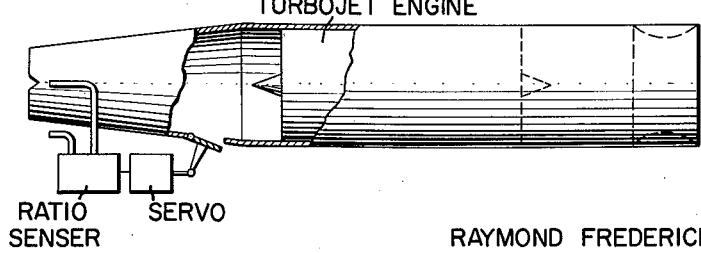
FIGURE 8 shows a further modification.

While the method of operation last described is preferred in the interest of simplicity, the engine may be arranged to fly at the desired free flight Mach number with critical intake condition, for example by the provision of aerodynamic or mechanical means for varying either the effective intake or discharge nozzle areas.

Where the invention is applied to an air intake duct constituting or forming part of a propulsion plant operating by combustion of fuel in the air flowing through the duct, the pressure in the duct is preferably changed by changing the rate of supply of the fuel for combustion in response to the changes in pressure sensed by the sensing means as already described. Alternatively the pressure in the duct may be changed by changing the area of one or more inlets or outlets through which gas is admitted to or discharged from the duct. FIGS. 6 and 7 show, respectively, control of exhaust nozzle area and inlet area for this purpose.

Where the duct supplies working medium to a mechanical compressor, turbine or other power conversion machine, the control may act upon the machine in any appropriate manner to achieve the desired result, for example by varying the loading upon the machine or by by-passing part of the working medium past the machine or some part of it. FIGURE 8 illustrates the case in which the duct supplies air to a turbine engine and part of the air is by-passed past the engine to control the pressure in the duct.

The area varying mechanisms now shown in FIGURES 6 and 7 is also shown in British Patent 593,070 to which the present case refers.

I claim:
1. A duct with an open intake end, for use immersed in a gas flowing lengthwise over the outside of the intake end of the duct at supersonic relative velocity, the duct having an opening through the wall thereof substantially at the location at which a shock wave is to be maintained within the duct, together with an impact pressure sensing head having a total head pressure sensing orifice directed substantially in the upstream direction, arranged to detect the impact pressure of the gas flowing over the outside of the duct at a position adjacent to and a short distance downstream of the opening, where the flow of the gas will be so disturbed by gas flowing out through the opening when the shock wave is located upstream of the most downstream part of the opening as to cause its impact pressure to change, and means responsive to changes in the impact pressure so detected for changing the pressure in the duct downstream of the opening in the sense to make the shock wave travel in that direction along the duct which tends to reduce the changes in pressure so detected, said opening comprising a notch in the lip of the intake end of the duct, said notch having a substantial dimension lengthwise of the duct.

2. A duct with an open intake end, for use immersed in a gas flowing lengthwise over the outside of the intake end of the duct at supersonic relative velocity, the duct defining a combustion zone and having an opening in the wall of the duct upstream of the combustion zone and substantially at the location at which a shock wave is to be maintained within the duct, together with means arranged to detect the impact pressure of the gas flowing over the outside of the duct at a position adjacent and downstream of the opening where the flow of the gas will be so disturbed by gas flowing out through the opening when the shock wave is located upstream of the most downstream part of the opening as to cause its impact pressure to change, and means for feeding fuel to the combustion zone, said detecting means being operatively connected to the fuel feeding means to maintain a rate of fuel feed substantially directly proportional to the impact pressure detected.

References Cited in the file of this patent

UNITED STATES PATENTS

| | | |
|---|---|---|
| 1,628,723 | Hall | May 17, 1927 |
| 2,551,470 | Smith | May 1, 1951 |
| 2,623,352 | Sédille et al. | Dec. 30, 1952 |
| 2,638,738 | Salter | May 19, 1953 |
| 2,727,525 | Harris | Dec. 20, 1955 |
| 2,796,730 | Lawrence | June 25, 1957 |
| 2,861,419 | Hausmann | Nov. 25, 1958 |
| 2,873,756 | Pool | Feb. 17, 1959 |
| 2,914,911 | Richter | Dec. 1, 1959 |
| 2,939,276 | Wise | June 7, 1960 |

FOREIGN PATENTS

| | | |
|---|---|---|
| 607,686 | Great Britain | Sept. 3, 1948 |
| 709,300 | Great Britain | May 19, 1954 |

OTHER REFERENCES

Flight, December 27, 1957, "Engine Intake Controls": Stack, B.A.C.; pages 1000–1002.

Aviation Age, "How To Match Ramjet Inlets and Performance," by A. N. Thomas, Vol. 25, No. 2, pages 24–31.